US006590691B1

(12) United States Patent
Nagra et al.

(10) Patent No.: US 6,590,691 B1
(45) Date of Patent: Jul. 8, 2003

(54) HYBRIDLY INTEGRATED OPTICAL MODULATION DEVICES

(75) Inventors: Amit S. Nagra, Pasadena, CA (US); Nathan G. Woodard, Pasadena, CA (US); Ronald T. Logan, Jr., Pasadena, CA (US)

(73) Assignee: Phasebridge, Inc., Pasadena, CA (US)

( * ) Notice: Subject to any disclaimer, the term of this patent is extended or adjusted under 35 U.S.C. 154(b) by 0 days.

(21) Appl. No.: 09/898,197

(22) Filed: Jul. 2, 2001

(51) Int. Cl.[7] .............................................. G02B 26/00

(52) U.S. Cl. ...................................... 359/237; 359/245

(58) Field of Search ................................ 359/237, 238, 359/245, 246; 385/2, 8, 4

(56) References Cited

U.S. PATENT DOCUMENTS

| | | | |
|---|---|---|---|
| 5,074,631 A | 12/1991 | Hamano et al. ................ 385/3 |
| 5,259,044 A | 11/1993 | Isono et al. ..................... 385/2 |
| 5,303,079 A | 4/1994 | Gnauck et al. ............. 359/180 |
| 5,359,449 A | * 10/1994 | Nishimoto et al. .......... 359/181 |
| 5,400,416 A | 3/1995 | Enokihara et al. ............. 385/2 |
| 5,455,876 A | * 10/1995 | Hopfer et al. .................. 385/2 |
| 5,550,513 A | 8/1996 | Wong ......................... 330/286 |
| 5,870,512 A | 2/1999 | Koch et al. .................... 385/14 |
| 6,122,414 A | 9/2000 | Shimizu ......................... 385/2 |
| 6,192,167 B1 | 2/2001 | Kissa et al. ..................... 385/3 |
| 2002/0109897 A1 | * 8/2002 | Mirshekar-Syahkal et al. .......................... 359/237 |
| 2002/0167711 A1 | * 11/2002 | Nespola et al. ............. 359/245 |

OTHER PUBLICATIONS

Alferness, Rod C., "Waveguide Electrooptic Modulators," *IEEE Transactions on Microwave Theory and Techniques*, vol. MTT–30, No. 8, Aug., 1982.

Burns, W.K., M.M. Howerton, R. P. Moeller, R. Krähenbühl, R.W. McElhanon, and A.S. Greenblatt, "Low Drive Voltage, Broad–Band LiNbO$_3$ Modulators With and Without Eteched Ridges," *Journal of Lightwave Technology*, vol. 17, No. 12, Dec., 1999.

Dagli, N., "Wide–Bandwidth Lasers and Modulators for RF Photonics," *IEEE Transactions on Microwave Theory and Techniques*, vol. 47, No. 7, Jul., 1999.

Gnauck, A. H., S. K. Korotky, J. J. Veselka, J. Nagel, C.T. Kemmerer, W.J. Minford, and D.T. Moser, "Dispersion Penalty Reduction Using an Optical Modulator with Adjustable Chirp," *IEEE Photonics Technology Letters*, vol. 3, No. 10, Oct., 1991.

Lao, Z., A. Thiede, U. Nowotny, H. Lienhart, V. Hurm, M. Schlectweg, J. Hornung, W. Bronner, K. Köhler, A. Hülsmann, B. Raynor, and T. Jakobus, "40–Gb/s High–Power Modulator Driver IC for Lightwave Communication Systems," *IEEE Journal of Solid–State Circuits*, vol. 33, No. 10, Oct. 1998.

Meghelli, M., M. Bouché, and A. Konczykowska, "High Power and High Speed InP DHBT Driver IC's for Laser Modulation," *IEEE Journal of Solid–State Circuits*, vol. 33, No. 9, Sep. 1998.

(List continued on next page.)

*Primary Examiner*—Georgia Epps
*Assistant Examiner*—M. Hasan
(74) *Attorney, Agent, or Firm*—Michael Pritzkau

(57) ABSTRACT

The present invention discloses high-speed, single-drive and dual-drive external optical modulation devices that reduce the voltage and power required to amplify and modulate electrical signals onto an optical carrier. Two primary components of an optical transmitter, namely, the modulator and driver, are integrated, and preferably hybridly integrated, in a single package, thereby eliminating many of the cable connector interfaces that add loss, complexity and cost to the system. Further, integration frees the devices from the standardized impedance (i.e. 50 ohm) constraints that reduce performance, thereby enabling the design of optimized, low voltage, hybridly integrated modulation devices.

80 Claims, 7 Drawing Sheets

OTHER PUBLICATIONS

Namiki, T., M. Mekada, H. Hamano, T. Yamane, M. Seino, and H. Nakajima, "Low–drive–voltage Ti:LiNbO$_3$ Mach–Zehnder modulator using a coupled line," in Tech. Digest, *Optical Fiber Communications Conference*, San Francisco, CA, 1990, paper TUH4.

Noguchi, K., O. Mitomi, and H. Miyazawa, "Millimeter–Wave Ti:LiNbO$_3$ Optical Modulators," *Journal of Lightwave Technology*, vol. 16, No. 4, Apr., 1998.

Schmid. R., T.F. Meister, M. Rest, and H.M. Rein, "SiGe Driver Circuit with High Output Amplitude Operating up to 23 Gb/s," *IEEE Journal of Solid–State Circuits*, vol. 34, No. 6, Jun., 1999.

Wooten, Ed. L., Karl M. Kissa, Alfredo Yi–Yan, Edmond J. Murphy, Donald A. Lafaw, Peter F. Hallemeier, David Maack, Daniel V. Attansasio, Daniel J. Fritz, Gregory J. McBrien, and Donald E. Bossi "A Review of Lithium Niobate Modulators for Fiber–Optic Communications Systems," *IEEE Journal of Selected Topics in Quantum Electronics*, vol. 6, No. 1, Jan./Feb. 2000.

AT&T Microelectronics, "Lithium Niobate Intensity (Amplitude) Modulator", Technical Note, Mar. 1995.

Lucent Technologies, Bell Labs Innovations, Microelectronics Group "Using the Lithium Niobate Modulator: Electro–Optical and Mechanical Connections", Technical Note, Apr. 1998.

Lin et al, Self–Aligned Hybrid Integration of Semiconductor Lasers with Micromachined Micro–Optics for Optoelectronic Packaging, May 29, 1995, Appl Phys Lett, vol. 66, No. 22, p. 2946–2948.

* cited by examiner

HYBRIDLY INTEGRATED OPTICAL MODULATION DEVICES

BACKGROUND OF THE INVENTION

1. Field of the Invention

The present invention relates to optical modulators and drivers used in high speed optical transmission systems and more particularly to a hybridly integrated driver and external modulator device designed to have low voltage and power requirements.

2. Description of the Related Art

The expected growing demand in the telecommunications field for higher frequency broadband communications systems has spawned and sustained the significant efforts in the development of medium haul and long haul fiber high speed optical transmission systems. Some of the conventional limitations of such systems include optical fiber loss, fiber dispersion and optical noise. With the advent of optical amplifiers that amplify the optical signal without first converting it to an electrical signal, optical loss is ostensibly no longer the limiting factor. However, one of the most significant system limitations remains fiber dispersion. In particular, when high frequency laser light sources are modulated to carry a signal, they produce pulses having large wavelength shifts about their center transmission wavelength, called "chirp." When applied to a dispersive medium such as optical fiber, the chirped pulses can become severely distorted when they reach a remote receiver, which can be tens or hundreds of kilometers away. Moreover, the severity of the dispersion problem increases with the spectral linewidth of the laser light source. In most modern medium and long haul systems that operate at a wavelength of 1.55 μm, fiber dispersion effects can thus become significant.

The two types of modulating schemes typically used in optical transmission systems are direct modulation and external modulation. In direct modulation, the electrical signal is combined with a bias and applied directly to the laser source. In this way, the signal directly modulates the laser gain and thus the optical intensity output of the source. While simple to design, since conventional semiconductor laser direct modulation techniques result in large linewidth (due to frequency chirping), direct modulation is not usually employed in medium and long-haul links at presently-considered high bit rates (e.g. 10 Gbps and above). Rather, external modulation techniques that result in lower dispersion penalty due to the narrow linewidth of the sources are presently preferred.

Among external modulators, electro-absorption modulators (EAM's) and electro-optic modulators (EOM's) are used in high-speed links. Electro-absorption modulators are compact in size, require low driving voltages, have wide bandwidths and can potentially be integrated with lasers and drive electronics. Unfortunately, electro-absorption modulators also tend to result in chirping of the laser output (although not as severe as in direct modulation) and thus are typically only used for span lengths less than 80 Km at 10 Gbps and for even smaller spans at higher bit rates. For high-speed links with span distances greater than approximately 80 Km, traveling-wave electro-optic modulators are the modulators of choice. EOM's can be phase modulators or intensity modulators, also called Mach-Zehnder modulators (MZM's). EOM's are fabricated in several material systems such as GaAs, InP, LiNbO$_3$ (lithium niobate) and polymers, but LiNbO$_3$ modulators are the most extensively used because they tend to have the best performance and reliability.

One of the major challenges in using conventional traveling-wave, electro-optic modulators is that they typically require high drive voltages. This problem is more severe at high bit rates because traveling-wave EOM's have a bandwidth versus drive voltage tradeoff. Thus, high-speed EOM's suffer from an even higher drive voltage requirement than other types. These higher drive voltages result in higher power dissipation in the modulator and driver circuits. Moreover, as bit rate requirements increase, the driver circuits that generate these high drive voltages to process these bit rates become increasingly difficult and expensive to manufacture.

Two important reasons for the high drive voltage and power requirements are: 1) non-idealities in the packages and interconnections between the traveling-wave modulator and the driver circuit; and 2) performance limitations in the driver and modulator due to the constraints of having standardized 50 Ω interface impedances. It should be understood that the requirement of having 50 Ω interface impedances stems from the use of industry standard 50 Ω connectors, cables and test equipment. It is also understood that the standardized impedance constraint need not necessarily by 50 ΩOther standardized impedance constraints are possible, such as 75 Ω.

Several attempts at addressing the high-voltage problem at these high frequencies have been made. For example, in Noguchi et al., "Millimeter-Wave Ti:LiNbPO$_3$ Optical Modulators," Journal of Lightwave Technology". Vol. 16, No. 4, April, 1998, the authors describe a Mach-Zehnder-type optical modulator with coplanar waveguide (CPW) electrodes, wherein a titanium-diffused waveguide is formed in a z-cut lithium niobate substrate in a ridge structure. As stated therein, an objective of the authors was to reduce conductor loss to lower the voltage requirement while maintaining velocity and 50 ohm impedance matching. While this design improved the performance of the modulator over other designs, it still included a 50 ohm impedance requirement as a design constraint.

The above-described drawbacks are present in the two common architectures for driving electrical signals in traveling-wave modulators, namely, single-drive and dual-drive modulation, which are now described in detail.

Single-Drive Modulators

Single-drive traveling-wave electro-optic modulators have just one electrical signal input, as opposed to dual-drive modulators that have two electrical inputs with the electrical signals 180 degrees out of phase, and which are described next. Single-drive modulators are easier to use than dual-drive versions and are most commonly employed in commercial systems. Single-drive modulators can be fabricated from LiNbO$_3$ (x-cut or z-cut), GaAs, InP or polymers. This discussion applies to single-drive modulators of all types, regardless of technology or fabrication methods.

FIG. 1 shows a conventional configuration for modulating an electrical signal onto an optical carrier using a single-drive modulator. In operation, an electrical input signal 12, which can be analog or digital, is first amplified with a packaged driver 30 and then modulated with a packaged modulator 20 onto an optical fiber 46 carrying light of a particular wavelength that is sourced by a continuous light source, such as a laser (not shown). Through the electro-optic effect in the modulator chip 22, the electrical signal is effectively converted into an optical signal that can be transmitted for long distances on the fiber 46 to an optical receiver.

The traveling-wave electro-optic modulator chip 22 and the driver chip 32 are enclosed in their own dedicated packages 20, 30, respectively. The interconnection between the driver circuit chip 32 and the traveling-wave modulator chip 22 is made through (a) a transition board 36 on the driver package 30; (b) a high frequency output connector 40 on the driver package 30; (c) an input connector 42 on the modulator package connected by a 50 Ω coaxial cable 44; and (d) a transition board 24 on the modulator package 20. Each of the transition boards is connected to the chips via wire bonds and has planar transmission lines.

More particularly, the signal 12 is fed into the driver chip 32 of the driver package 30 from a first transition board 34 via wire bonds 38, and from the driver chip to a second transition board 36 via bond wires 39. The second transition board includes planar 50 Ω transmission lines with input/output bond pads. The output of the transition board 36 goes to a 50 Ω high-frequency output connector 40 that acts as the package feedthrough. The amplified signal is then routed over the 50 Ω coaxial cable 44 to the input connector 42 of the modulator package 20. From the input connector on the modulator package to the input pads on the modulator chip, the signal must traverse over another transition board 24 similar to that in the driver package.

FIG. 2 depicts an electrical equivalent circuit for the system depicted in FIG. 1. The bond wires 28, 29 and 39 shown in FIG. 1, are shown here as sources of inductance 28', 29', and 39', respectively, while the pads and discontinuities in the transmission lines act as reactive, generally capacitive, elements. Disadvantages to this conventional design include: (1) the bond wires and reactive discontinuities associated with every interface are a source of reflections for the electrical signals. Reflections need to be kept to a minimum since multiple bounces of the electrical signal are transferred to the optical signal in the modulator and can lead to intersymbol interference, jitter, eye closure, etc., which all cause degradation of the transmitted optical signal; (2) The transitions act as low pass filters and thus limit the bandwidth of the system. They also cause variations in the group delay. This bandwidth reduction slows down the rise and fall times of the pulses, while the variations in group delay can cause pulse spreading and overshoot, leading in turn to intersymbol interference and jitter; (3) The planar transmission lines on the transition boards, connectors and the coaxial cable introduce loss in the path of the electrical signal. Since a fixed drive voltage is required at the modulator input for acceptable system performance, high electrical loss in the transitions must be compensated by increasing the output voltage from the driver. Not only does this make the driver design problem hard due to breakdown issues, it also increases the power dissipation in the driver making thermal management harder; and (4) The cost associated with multiple high frequency packages, connectors and cables can be very high and often becomes significantly greater than the cost of the active components.

Another problem with the conventional scheme relates to the interconnection of the driver and modulator. In particular, the use of conventional 50 Ω high frequency connectors and cables forces the driver output impedance and the modulator input impedance to be close to or at 50 Ω in order to keep signal reflections to a minimum and thus power transfer at a maximum. Unfortunately, this 50 Ω impedance constraint for the driver and modulator is a substantially design restriction for several reasons. First, as is well understood, traveling-wave EOM's are designed to have velocity match between the optical mode velocity and the electrical signal velocity. The electrical signal velocity is a function of the electrode geometry as is the impedance of the electrodes. Specifying the modulator impedance to a conventional value, such as 50 Ω, places a constraint on the modulator's electrode geometry and leaves little, if any, room for improving the electro-optic performance. This results in modulator's having higher drive voltage requirements than might otherwise be required.

Moreover, the negative effects of forcing the driver output impedance to 50 Ω are even more apparent. The driver output stage sees an effective impedance of approximately 25 Ω because the driver output impedance appears in parallel with the modulator input impedance. This means that the driver needs to supply twice the current compared to a driver with infinite output impedance in order to generate the same output voltage swing. This results in higher power dissipation in the driver output stage.

Thus, it would be desirable to have this impedance constraint is lifted so that the electrode geometry could be designed for both velocity matching and optimum electro-optic performance, resulting in modulators requiring substantially lower drive voltages.

Dual-Drive Modulators

One of the most common configurations for using dual-drive modulators is the system 100 shown in FIG. 3, comprising a traveling-wave electro-optic modulator 122 and a driver circuit 132 enclosed in their own dedicated packages, 120 and 130 respectively. Two signal electrodes separated by a ground electrode each carry an equal, but 180 degrees out of phase, signal. Each signal independently controls the electro-optically induced phase shift in the two branches of the optical waveguide. Two main advantages that dual-drive modulators have been shown to have over single-drive modulators are adjustable chirp and reduced drive voltages. The advantages of variable chirp and the methods of achieving variable chirp using dual-drive modulators are well known in the art. Moreover, several groups, such as Namiki et al., have worked on reducing drive voltages through the use of dual-drive modulators. See for example, T. Namiki, et al., "Low Drive Voltage Ti:LiNbO$_3$ Mach-Zehnder Modulator Using A Coupled Line" Tech. Digest, Optical Fiber Communications Conference, San Francisco, Calif. 1990, paper TUH4. Dual-drive modulators can be fabricated using LiNbO$_3$, GaAs, InP or polymers and the comments made here apply to all dual-drive modulators.

The interconnection between the dual-drive driver circuit chip 132 and the dual-drive, traveling-wave modulator chip 122 is made through (1) transition board 136 on the packaged driver 130; (2) high frequency driver output connectors 140 and 141; (3) 50 Ω coaxial cables 144 and 145; (4) high frequency modulator input connectors 142 and 143; and (5) transition boards 124 and 125 on the modulator package 120. Both the variable chirp and reduced drive voltage applications described above require the two signals arriving at the inputs of the modulator to be complementary, i.e. 180 degrees out of phase from each other. Thus, the transition boards, cables and connectors in the two signal paths must be phase matched so that the two signals remain 180 degrees out of phase at the modulator 122. While generating signals with 180 degrees of phase difference at the driver circuit output is relatively trivial, and, in fact, is readily obtainable with the use of differential pair stages, maintaining the phase difference all the way to the modulator chip 122 is very difficult when the signal must travel through all of these external cables and connectors. This task is further complicated by phase mismatching caused by temperature drifts.

Thus, it would be desirable to eliminate the need for phase-matched cables and connectors in dual-drive modulator systems. It should be understood that the disadvantages listed previously for single-drive packaged devices with 50 Ω interface impedances also apply to dual-drive devices. The transition boards, connectors and cables cause signal loss and signal distortion. Moreover, the 50 Ω interface impedance results in dual-drive modulators and drivers with non-optimal performance and thus higher voltage requirements.

Theoretically, the drive voltage required per signal electrode in the dual-drive case is half that required for the single-drive electrode and the power dissipated per signal electrode is 25% the power dissipated in the single electrode case. However, since two electrodes are to be driven, the net power dissipation for the dual-drive case is 50% that of the single-drive. This factor of two reduction in the drive voltage and power has very significant benefits, especially at very high bit rates, such as 40 Gbps, where it is very difficult to make driver circuits with large output voltage swings.

Thus, it would be highly desirable to have a high-speed traveling-wave modulator device having relatively low drive voltage and power requirements for a given bandwidth of interest.

SUMMARY OF THE INVENTION

The present invention, which addresses these needs, resides in an optical modulation device and method for modulating within a given bandwidth an electrical signal onto an optical carrier. The device includes an electrical driver that amplifies the signal to be optically modulated, including a driver circuit and an output impedance network, $Z_d$, and a traveling-wave optical modulator. The modulator includes an electrical input connected to the driver, an optical waveguide linked to the optical carrier, and a traveling-wave electrode having an impedance, $Z_m$. The modulator is configured to reduce the voltage required to drive the signal within the given bandwidth without conforming to a standardized impedance criteria, such as the 50 ohm standard of conventional modulators.

In one preferred embodiment, the driver and traveling-wave optical modulator are integrated in a single package and may more particularly be hybridly integrated in a single package. The modulator of the device of the present invention may be an electro-optic modulator. It may more particularly be a Mach-Zehnder electro-optic modulator. In one specific implementation of the device of the present invention, the electro-optic traveling-wave modulator is fabricated on a z-cut lithium niobate substrate and includes at least two electrodes geometrically configured to provide velocity match and a buffer layer disposed between the electrodes and the optical waveguide that is configured to increase the field overlap between the electrical signal and the optical waveguide, thereby reducing the drive voltage requirement of the modulator.

In another specific implementation of the optical modulation device that includes an electro-optic traveling-wave modulator, the modulator is fabricated on an x-cut lithium niobate substrate and includes at least two traveling-wave electrodes configured to provide velocity match and an electrode gap disposed between the electrodes that is configured to increase the field overlap between the electrical signal and the optical waveguide, thereby reducing the drive voltage requirement of the modulator.

In alternative embodiments, the modulator in the device of the present invention may be a phase modulator or an electro-absorption modulator, a single-drive modulator or a dual-drive modulator.

In any of the modulator embodiments of the device of present invention the driver impedance $Z_d$ may have a value that is chosen to reduce the power dissipation in the driver without conforming to a standardized impedance criteria, such as 50 ohms. In the preferred embodiment, $Z_d$ has a value that is chosen to minimize the power dissipation in the driver chip without conforming to a standardized impedance criteria.

In another implementation of the present invention, an optical modulation device for modulating within a given bandwidth an electrical signal onto an optical carrier is disclosed. This device includes an electrical driver that amplifies the signal to be optically modulated, including a driver circuit and an output impedance network, $Z_d$ and a traveling-wave, electro-optic optical modulator. The modulator has an electrical input connected to the driver, a traveling-wave electrode having an impedance, $Z_m$, and an optical waveguide linked to the optical carrier. The modulator is configured to reduce the voltage required to drive the signal within the given bandwidth without conforming to a standardized impedance criteria, and the driver and modulator are integrated in a single package.

In yet another aspect of the invention, the optical modulation device of the present invention includes means for amplifying the signal to be optically modulated, and means for modulating the amplified signal onto the optical carrier, the means being configured to reduce the voltage required to drive the signal within the given bandwidth without conforming to a standardized impedance criteria. The device may further include means for integrating the means for amplifying and the means for modulating into a single package.

The present invention also resides in a method of reducing the voltage and power required to modulate within a given bandwidth an electrical signal onto an optical carrier. This method includes providing a driver that amplifies the signal, providing a traveling-wave optical modulator that includes an input connected to the driver, an optical waveguide and a traveling-wave electrode having an impedance, $Z_m$, configuring the modulator to reduce the drive voltage needed to drive the signal within the given bandwidth without conforming to a standardized impedance matching criteria and combining the driver and modulator as a single device. In a more particular aspect of this inventive method, the step of providing the driver and modulator as a single device includes integrating the driver and modulator into a single package. Preferably, the driver and modulator are hybridly integrated in the package to improve performance.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

The present invention improves the performance of high speed optical transmitters by integrating the driver and modulator into a single package, thereby eliminating many of the standard components used in the design of such systems and freeing the design process from the standard impedance constraints of conventional components. Most commonly, this standard impedance constraint is 50 ohms, but it need not be. The present invention improves the performance of conventional transmitters whatever value the standardized impedance of the conventional drive and modulator packages and connectors and cables may be (e.g. 75 ohms, 100 ohms, etc.).

One preferred integration method of the present invention is referred to herein as "hybrid integration." In hybrid integration, the primary optical transmitter components are integrated in a single package but may be comprised of different materials. Hybrid integration is desirable because it removes the constraint imposed by monolithic integration of having the driver and modulator fabricated on the same chip with the same materials. Hybrid integration allows combining the best available modulators with the best available driver circuits in the same package, while eliminating the non-ideal connector/cable based interconnection system.

Another important feature of the hybrid integration scheme of the present invention is the designer's freedom from the 50 Ω interface impedance requirement. As will be shown, this freedom can be fully exploited to enhance performance in both the driver and the modulator.

Figure 1:
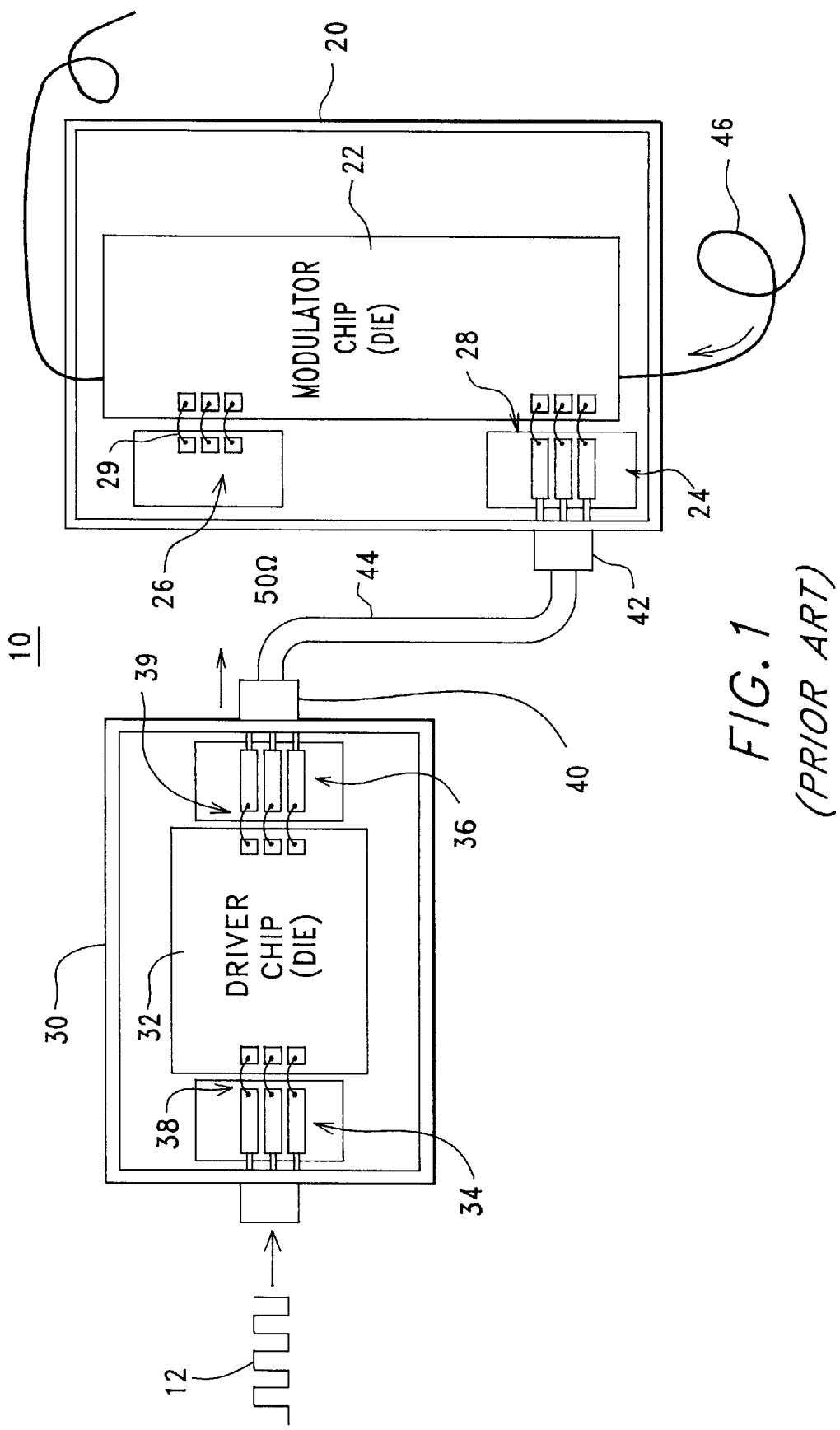
FIG. 1 is an illustrative diagram of a conventional single-drive external optical modulator system wherein a packaged driver is connected to a packaged modulator.
Figure 4:
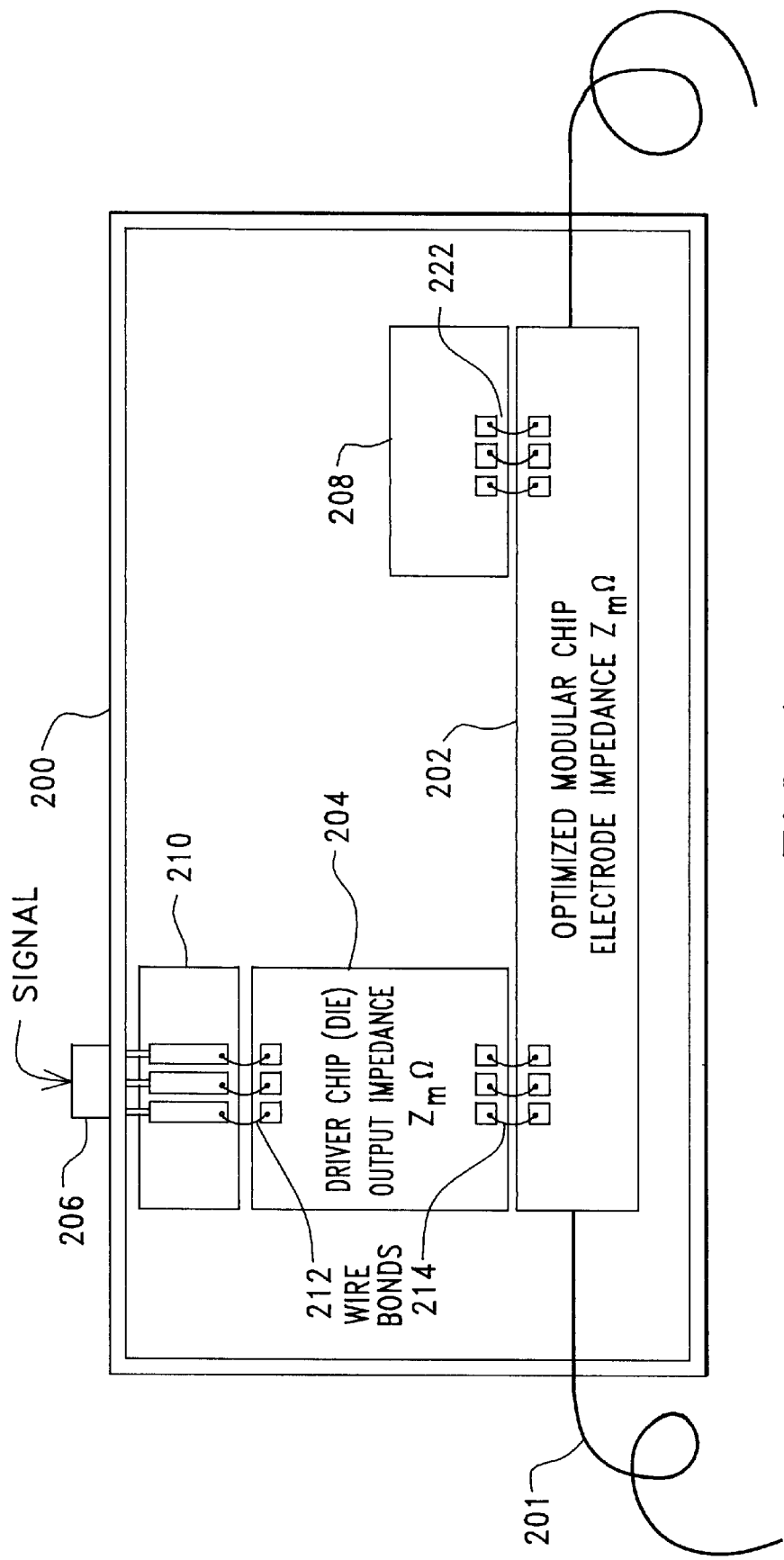
FIG. 4 is an illustrative diagram of one embodiment of an integrated, single-drive, external optical modulation device according to the present invention.

One basic embodiment of the present invention is the optical modulation device 200 shown in FIG. 4. As seen, the modulator (in chip form) 202 and the driver (in chip form) 204 are integrated within the same package 200. The electrical signal to be amplified and then modulated enters signal input connector port 206 to transition board 210 and to the driver chip 204 via wire bonds 212. The connection between the two chips is made through wire bonds 214 but other possibilities exist. The modulator 202 is terminated with termination board 208. Compared to the conventional design shown in FIG. 1, the interconnect distance between the driver and modulator is now very short and has far fewer interfaces, thereby resulting in lower interconnection parasitics.

Figure 2:
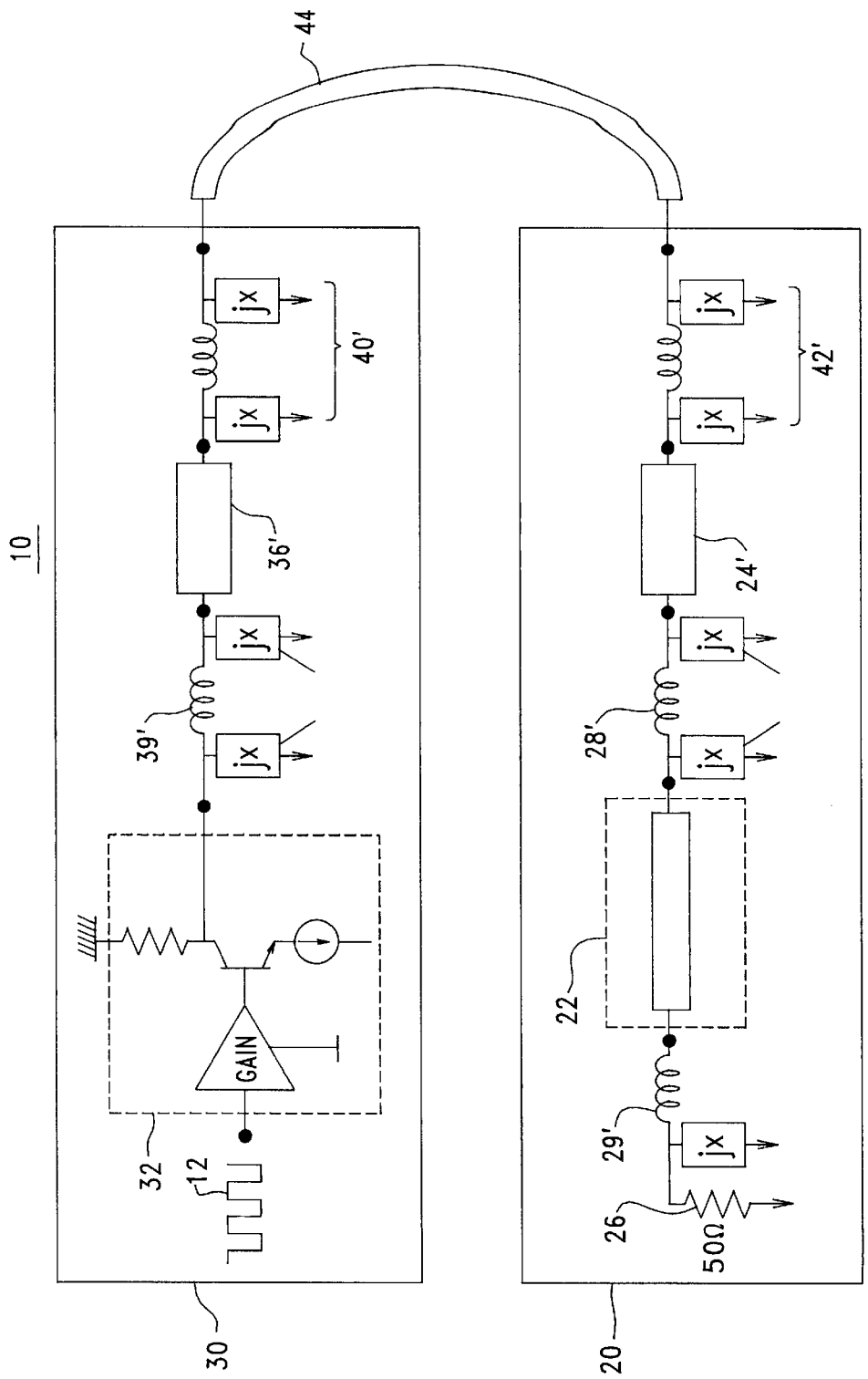
FIG. 2 is a schematic of an equivalent electrical circuit of the conventional single-drive system shown in FIG. 1.
Figure 3:
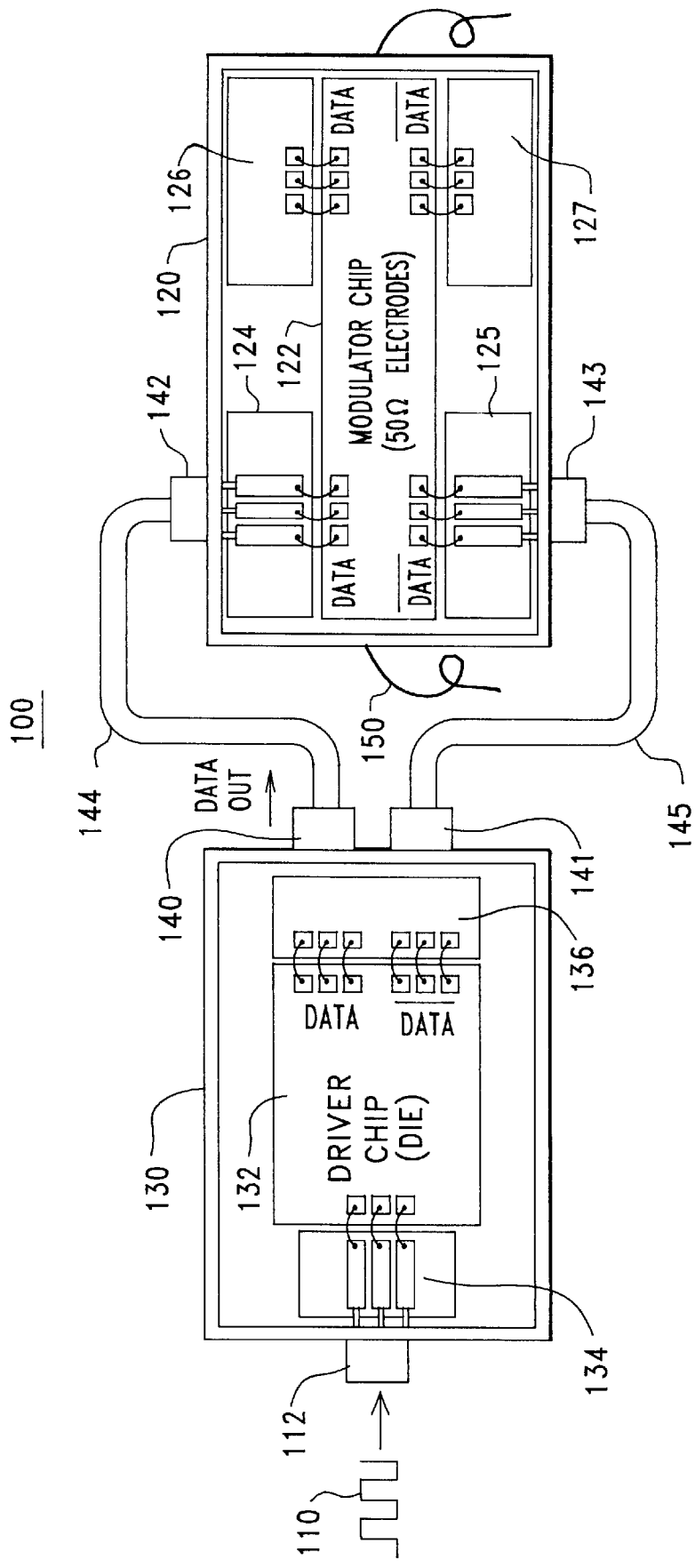
FIG. 3 is an illustrative diagram of a conventional dual-drive, external optical modulator system wherein a packaged driver is connected to a packaged modulator.
Figure 5:
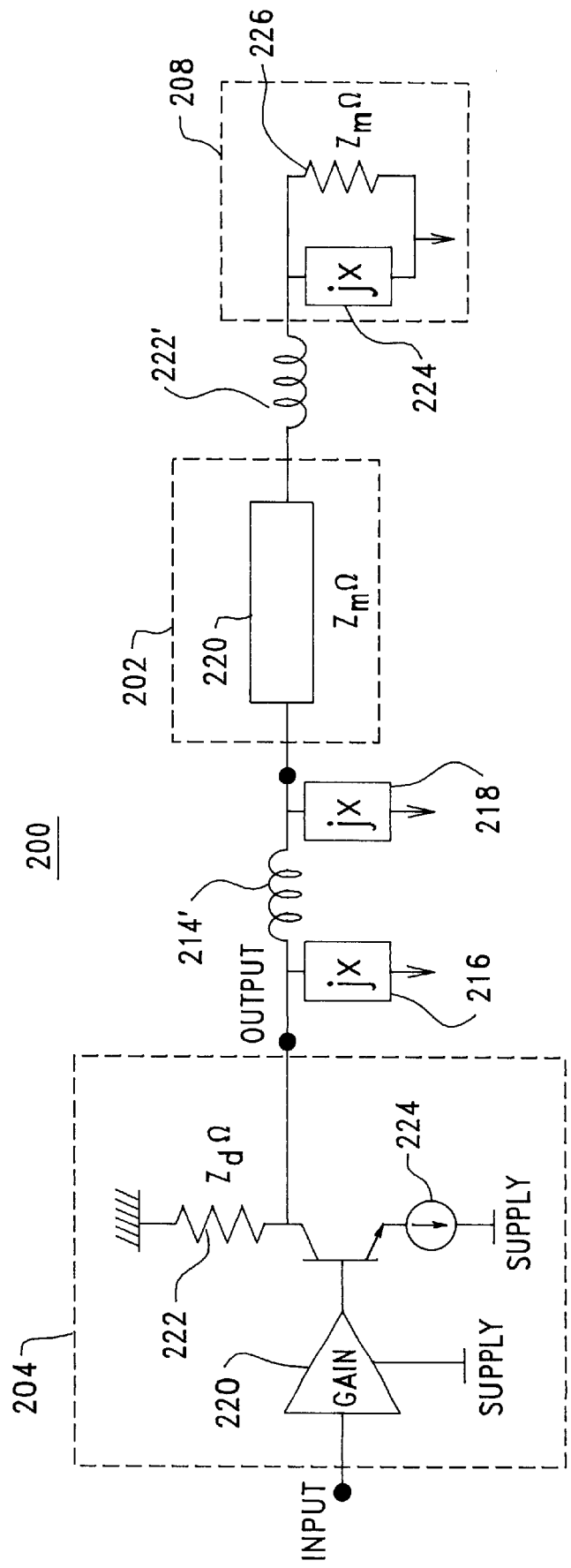
FIG. 5 is a schematic of an equivalent electrical circuit of the inventive single-drive device shown in FIG. 4.

This is shown in FIG. 5, which is the electrical schematic of the embodiment shown FIG. 4. In particular, the driver chip 204 comprises an amplification stage 220 and an impedance $Z_d$ 222, which may now be optimized to any value. The output of the driver 204 is connected to the input of the modulator chip 202 via a single wire bond, shown here as an inductance 214' between discontinuity reactances 216 and 218. Then, the output of the modulator chip 202, having an electrode impedance $Z_m$ 202, is terminated via wire bond inductance 222' to a matching load on the termination board 208, which looks like a matching impedance $Z_m$ 226 in parallel with a reactance 224. Compared to FIG. 2, which shows the electrical schematic of a conventional single-drive driver modulator system, it can be seen that the fewer interfaces of the present invention significantly reduces the number of undesirable parasitics, resulting in smaller signal loss, smaller group delay deviation and reduced signal reflections. This enhancement in performance is accompanied by lower cost because (1) one package has been eliminated; and (2) the high frequency cable and connectors between the driver and modulator have been eliminated.

Alternative single-drive driver/modulator connection schemes are also possible. For example, one possibility is to use a flexible/rigid substrate with planar transmission lines that can then be flip chip mounted between the driver and modulator in place of wire bonds.

The advantages of integration that are described above are obvious benefits of hybrid integration. However, another important benefit of hybrid integration is that the elimination of the standardized connectors frees the system from the 50 ohm impedance requirement, thereby enabling the designer to optimize the impedances of the driver and modulator for best possible performance.

More particularly, having impedance as a free variable enables the design of a low drive voltage modulators. As discussed previously, traveling-wave, electro-optic modulators are designed to have velocity match between the optical mode velocity and the electrical signal velocity. It is well known that a velocity mismatch between the electrical signal and optical mode can lead to reduced bandwidth in the modulator. Hence, high bit rate modulators require velocity matching—a requirement that cannot be waived. The optical mode velocity is a function of the material composition of the waveguides. Thus, there is not much room to adjust the optical mode velocity. However, both the electrical signal velocity and the impedance of the electrodes are functions of the electrode geometry. Thus, as in the conventional case, specifying the modulator impedance places a constraint on the electrode geometry and leaves no room for improving the electro-optic performance, thereby resulting in higher drive voltages. By lifting the impedance constraint, the electrode geometry can be designed for velocity matching and optimum electro-optic performance for a given bandwidth, resulting in modulators with the lowest possible drive voltages but with impedances different from 50 Ω. Two such improved traveling-wave modulators, one fabricated on a z-cut $LiNbO_3$ substrate and another on an x-cut $LiNbO_3$ substrate, are now described.

Figure 6:
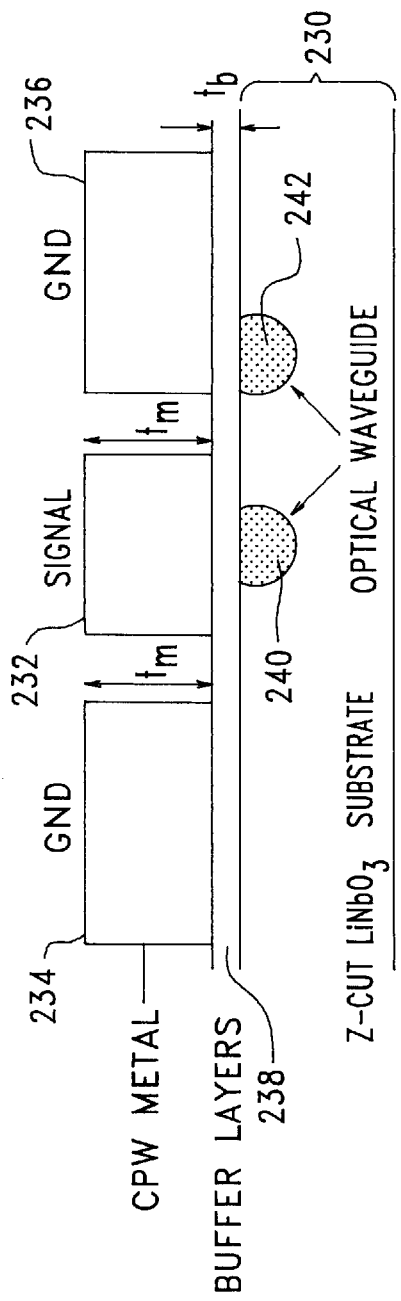
FIG. 6 is a cross-sectional view of a first embodiment of an optimized single-drive, traveling-wave modulator designed according to the present invention.

FIG. 6 is a cross-sectional view of one preferred single-drive traveling-wave modulator fabricated on a z-cut $LiNbO_3$ substrate 230. Coplanar waveguide (CPW) transmission line signal electrode 232 between ground electrodes 234, 236, carries the signal to be modulated. Optical waveguides 240 and 242 are beneath the electrodes and separated from them by a buffer layer 238. The first optical waveguide 240 is directly beneath the signal electrode 232 and the second waveguide is beneath ground electrode 236. One way of improving the electro-optic performance of such modulators fabricated on z-cut $LiNbO_3$ is to reduce the buffer layer thickness $t_b$ of the buffer layer 238 compared to conventional 50-Ohm designs. This relatively thinner buffer layer 238 results in stronger field overlap between the optical mode and the electric field generated by the voltage on the signal electrode, which in turn leads to lower drive voltages. However, in order to meet the high bandwidth requirements for a given application, the velocity matching criteria must still be satisfied. This can be achieved by increasing the thickness of the CPW metal, $t_m$, of each of the electrodes 232, 234 and 236 compared to conventional designs. The resultant structure has an impedance lower than 50-Ohms, and typically in the 25–40 Ohm range, depending on the details of the geometry involved.

Figure 7:
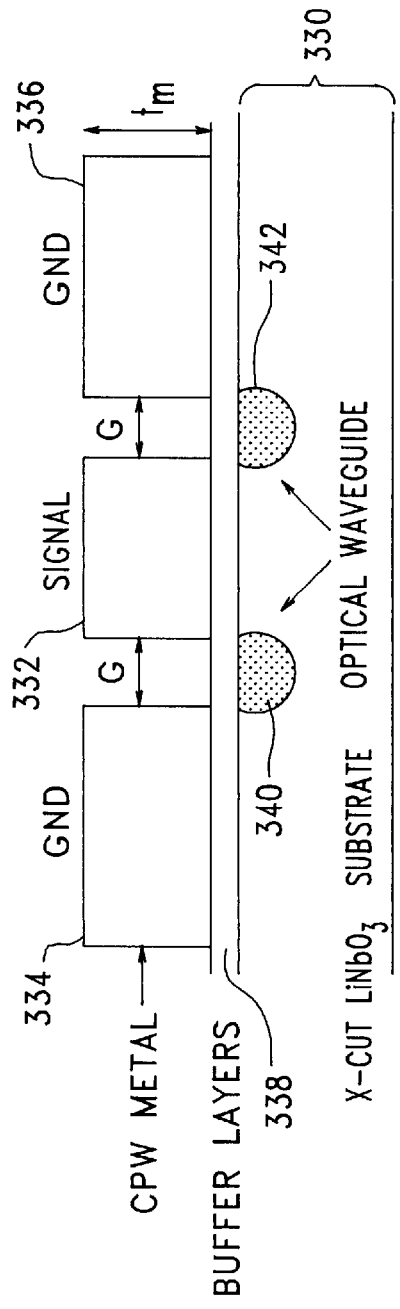
FIG. 7 is a cross-sectional view of a second embodiment of an optimized single-drive, traveling-wave modulator designed according to the present invention.

Similarly, as shown in FIG. 7, single-drive traveling-wave modulators fabricated on x-cut LiNbO$_3$ substrates 330 can be improved or optimized over conventional designs by reducing the electrode gap G and repositioning the waveguide branches 340 and 342 with respect to the electrodes 332, 334 and 336. This leads to a stronger electric field overlap between the electrical signal 332 and the optical waveguide branches 340, 342 leading to lower drive voltage requirements. As in the prior embodiment, the velocity of the electrical and optical signals can be matched by making the electrode thickness greater than that used in 50-Ohm designs. This again leads to low impedance modulators with impedances in the 25–40 Ohm range. Thus, with simple alterations of the electrode geometry employed in 50-Ohm traveling-wave modulators, it is possible to reduce the drive voltage requirements by letting the impedance vary.

It should be understood that improving modulator electro-optic performance by lifting the impedance constraint can be applied to modulators fabricated using any appropriate material system and electro-optic modulator technology. For example, the techniques described herein apply to electro-optic devices designed with polymers, gallium arsenide, indium phosphide, or other semi-conductor materials.

The driver circuit can also be optimized by appropriate choice of the output impedance. The driver output stage sees an effective impedance that is the parallel combination of the driver output impedance and the modulator input impedance. This means that a driver that is matched to the modulator needs to supply twice the current compared to a driver with infinite output impedance in order to generate the same output voltage swing. This results in higher power dissipation in the driver output stage. However, a driver with very high output impedance reflects strongly the signal that is traveling towards it. Thus, in order to keep the multiple signal bounce problem under control it becomes necessary to keep the signal reflections from the modulator-termination interface as small as possible. This requires that the termination resistance be very closely matched to the modulator electrode impedance and the modulator-termination connection be made with very low parasitics. As a compromise, in the preferred embodiment of the present invention, a driver with output impedance in the 70–100 Ohm range is used so that power dissipation is minimized, but at the same time the requirements on the modulator termination are not overly stringent.

The benefits of applying the techniques proposed here are quantified for single-drive modulator applications in Table 1 below, which compares performance characteristic of typical conventional traveling-wave modulator and driver systems with the simulated results of the hybridly integrated traveling-wave modulator and driver combination of the present invention.

TABLE 1

|  | Packaged modulator and driver with 50Ω impedances | Hybrid integrated modulator and driver with optimum impedances |
|---|---|---|
| Dc $V_{pi}$ | $V_\pi(DC) = 5V$ | $V_\pi(DC) = 4V$ |
| $V_{pi}$ at speed | $V_\pi(40\ GHz) \approx$ | $V_\pi(40\ GHz) \approx$ |

TABLE 1-continued

|  | Packaged modulator and driver with 50Ω impedances | Hybrid integrated modulator and driver with optimum impedances |
|---|---|---|
| Voltage on driver chip | $1.4 \times V_\pi(DC) = 7.0V$ $V_d^{pp} =$ $1.12 \times V_\pi(40\ GHz) = 7.85V$ | $1.4 \times V_\pi(DC) = 5.6V$ $V_d^{pp} =$ $1.06 \times V_\pi(40\ GHz) = 5.9V$ |
| Modulator impedance | $Z_m = 50\Omega$ | $Z_m = 35\Omega$ |
| Driver impedance | $Z_d = 50\Omega$ | $Z_d = 85\Omega$ |
| Effective load | $Z_{eff} = Z_m \| Z_d = 25\Omega$ | $Z_{eff} = Z_m \| Z_d = 24.7\Omega$ |
| RF Power dissipation assuming single tone | $P_d = \dfrac{(V_d^{pp})^2}{8Z_{eff}} = 0.3\ W$ | $P_d = \dfrac{(V_d^{pp})^2}{8Z_{eff}} = 0.175\ W$ |

As seen, the packaged driver and modulator are assumed to both have 50 Ohm impedances resulting in an effective load impedance of 25 Ohms. The drive voltage for maximum extinction required by the non-optimized modulator is 5 V at DC and the 3-dB bandwidth is assumed to be 40 GHz. The resulting drive voltage at 40 GHz can be calculated to be 7 V p-p. The loss in the interconnect between the packages is assumed to be 1 dB and so the output voltage on the driver chip must be 7.85 V p-p. The RF power dissipation (assuming a single sinusoidal tone) in the effective output load is 0.3 W.

The optimized modulator is assumed to have an impedance of 35 Ohms with a 20% improvement in drive voltage. Thus, the drive voltage at DC is 4 V and at the 3-dB bandwidth frequency of 40 GHz the drive voltage required is 5.6 V p-p. The loss in the transition is assumed to be only 0.5 dB here so the voltage output from the driver needs to be 5.9 V p-p. This optimized modulator has 25% lower drive voltage requirement than the combinations of individually packaged devices. The driver output impedance is about 85 Ohms so that the effective load impedance is still approximately 25 Ohms (85 Ohms∥35 Ohms). The RF power dissipated in the effective load for the optimized approach is 0.175 W which is about 40% lower than the prior art for single-drive modulators.

Dual-Drive Integrated Package

The benefits of hybrid integration are even more pronounced in the case of dual-drive modulators. As discussed earlier, dual-drive modulators are attractive because they offer the possibility of variable chirp and reduced drive voltage per electrode. However, to achieve these benefits the drive signals applied to the two electrodes must be substantially 180 degrees out of phase. Maintaining this phase difference over external connectors and cables is difficult, especially with manufacturing process tolerances and temperature variations. However, as shown in FIG. 8, the present invention employs hybrid integration of the driver and the dual-drive modulator within the same package.

Figure 8:
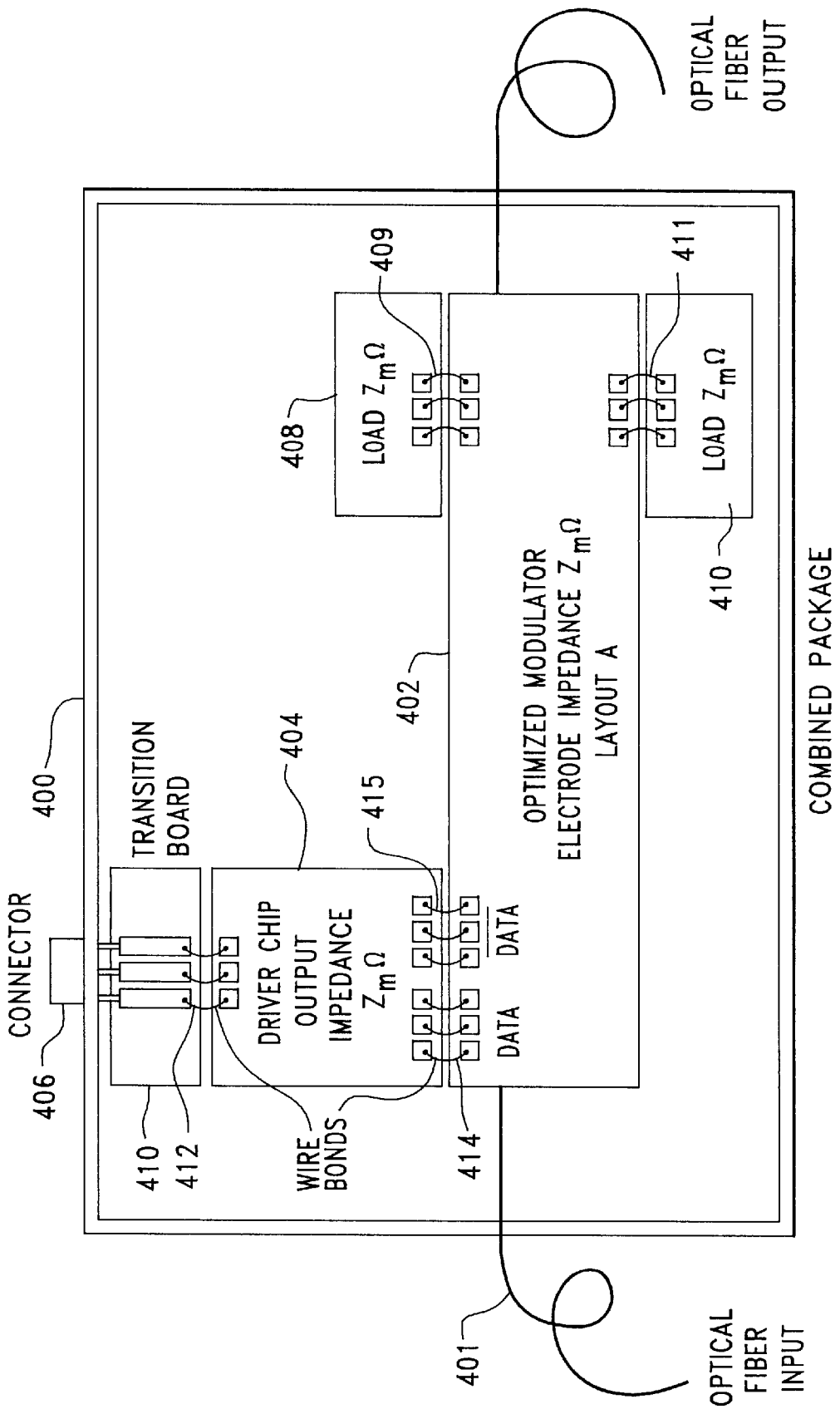
FIG. 8 an illustrative diagram of one layout of a hybridly integrated dual-drive external optical modulation device designed according to the present invention.

Referring to FIG. 8, a dual-drive driver/modulator combined package 400 is shown having a dual-drive driver (in chip form) 404 having two signal paths connected to an optimized dual-drive modulator in chip form (402) via wire bonds 414 and 415. Note that the dual-drive modulator is designed so that the inputs are side by side and can thus be connected to the driver outputs using short bond wires or short transition boards. Since the connections are made within the same package, it is relatively easy to keep the path lengths for the two signals matched and the phases at 180 degrees from each other. This becomes increasingly important at higher bit rates (10 Gbps and above) where phase mismatches between the two signal arms can result in chirp, jitter and pulse distortion.

In addition to the ease of phase matching, all the benefits previously identified for single-drive modulators also apply in the dual-drive design. Hybrid integration gets rid of the connection non-idealities due to the connectors and cables. This includes loss in the transitions, group delay deviations, and multiple signal reflections. Moreover, freedom from the 50-Ohm interface impedance constraint can be exploited even in the case of dual-drive modulators and drivers. The electrodes of the dual-drive modulator are designed to attain velocity matching with the best possible electro-optic efficiency and the driver output impedance is optimized to minimize drive power while keeping signal reflections at a reasonable level. Hence, hybrid integrated dual-drive modulators with improved impedances in the same package as dual-drive drivers with improved impedances offer an extremely attractive solution over conventional dual-drive designs.

Having thus described exemplary embodiments of the invention, it will be apparent that further alterations, modifications, and improvements will also occur to those skilled in the art. Further, it will be apparent that the present device and technique and is not limited to single-drive or dual-drive Mach-Zehnder modulators, but to any kind of optical modulators and modulation systems that can benefit from the optimizing techniques described herein. Accordingly, the invention is defined only by the following claims.

We claim:

1. A modified optical modulation system, said modified optical modulation system being configured to replace an unmodified optical modulation system including an unmodified electrical driver and an unmodified traveling-wave modulator using a standard interface impedance therebetween, each of which systems is configured for modulating an input optical signal in response to at least one input electrical signal to produce a modulated optical signal, said modified optical modulation system comprising:
a modified electrical driver for amplifying the input electrical signal to produce a modified drive signal; and
a modified traveling-wave modulator for receiving said modified drive signal and said input optical signal for use in modulating said input optical signal, said modified traveling-wave modulator including a modified modulator impedance which is selected irrespective of said standard interface impedance to velocity match, at least to an approximation, an electrical signal velocity of the modified drive signal in the modified traveling-wave modulator to an optical mode velocity, at which the input optical signal travels during modulation in the modified traveling-wave modulator.

2. The modified optical modulation system of claim 1, wherein the modified electrical driver and the modified traveling-wave modulator are electrically connected by a plurality of bonding wires.

3. The modified optical modulation system of claim 2 wherein the modified electrical driver and the modified traveling-wave modulator are electrically connected by said plurality of bonding wires such that a first end of each bonding wire is wire bonded to the modified electrical driver and a second end of each bonding wire is wire bonded to the modified traveling-wave modulator.

4. The modified optical modulation system of claim 1 further comprising a support assembly for supporting the modified electrical driver and the modified traveling-wave modulator within a single package.

5. The modified optical modulation system of claim 4 wherein said support assembly defines a unitary package cavity, in which package cavity said modified electrical driver and said modified traveling-wave modulator are supported.

6. The modified optical modulation system of claim 4 wherein said support assembly includes a support surface, on which support surface said modified electrical driver and said modified traveling-wave modulator are mounted.

7. The modified optical modulation system of claim 1, wherein the modified traveling-wave modulator is a modified electro-optic modulator.

8. The modified optical modulation system of claim 7, wherein the modified electro-optic modulator includes a Mach-Zehnder interferometer.

9. The modified optical modulation system of claim 7, wherein the modified electro-optic modulator is a phase modulator.

10. The modified optical modulation system of claim 7, wherein said unmodified electrical driver produces an unmodified drive signal for use by the unmodified traveling-wave modulator, wherein said unmodified and modified drive signals are characterized by a first electric field and said input optical signal is characterized by a second electric field, and wherein the modified electro-optic modulator is fabricated on a z-cut lithium niobate substrate and includes
an electrode for guiding said modulated drive signal along a particular path,
an optical waveguide for guiding said input optical signal therethrough, and
a modified buffer layer disposed between the electrode and the optical waveguide, said modified buffer layer having a modified thickness value which is less than an unmodified buffer layer thickness that is used in the unmodified traveling-wave modulator of said unmodified optical modulation system such that a modified field overlap between said first and second electric fields within said modified electro-optic modulator is greater than an unmodified field overlap between said first and second electric fields within said unmodified traveling-wave modulator.

11. The modified optical modulation system of claim 10 wherein said electrode includes a modified electrode thickness, which modified electrode thickness is greater than an unmodified electrode thickness used in said unmodified traveling-wave modulator of said unmodified optical modulation system.

12. The modified optical modulation system of claim 7, wherein the modified electro-optic modulator is fabricated on an x-cut lithium niobate substrate and includes
at least two electrodes for guiding said modified drive signal along a particular path, said electrodes defining at least one electrode gap therebetween, said electrode gap having a modified gap width which is less than a gap width that is used in the unmodified traveling-wave modulator of said unmodified optical modulation system.

13. The modified optical modulation system of claim 12 wherein said unmodified electrical driver produces an unmodified drive signal for use by the unmodified traveling-wave modulator, wherein said unmodified and modified drive signals are characterized by a first electric field and said input optical signal is characterized by a second electric field, and wherein said modified electro-optic modulator further includes a modified optical waveguide for guiding said input optical signal therethrough, said modified optical waveguide being positioned with respect to said electrodes such that a modified field overlap between said first and second electric fields within said modified electro-optic modulator is greater than an unmodified field overlap between said first and second electric fields within said unmodified traveling-wave modulator.

14. The modified optical modulation system of claim 1 wherein the modified traveling-wave modulator is an electro-absorption modulator.

15. The modified optical modulation system of claim 1, wherein the modified traveling-wave modulator is a modified single-drive modulator.

16. The modified optical modulation system of claim 1, wherein the modified traveling-wave modulator is a modified dual-drive modulator.

17. The modified optical modulation system of claim 1 wherein said modified modulator impedance is further selected such that the modified drive signal is less than an unmodified drive signal, which unmodified drive signal is produced by the unmodified electrical driver for use by the unmodified traveling-wave modulator.

18. The modified optical modulation system of claim 1 wherein said modified modulator impedance is selected to be different than said standard interface impedance, which standard interface impedance is 50 ohms.

19. The modified optical modulation system of claim 1 wherein the modified electrical driver and the modified traveling-wave modulator are electrically connected by a flip-chip bond.

20. The modified optical modulation system of claim 1 wherein said modified electrical driver includes a modified driver impedance, which modified driver impedance is selected irrespective of said standard interface impedance such that said modified optical modulation system exhibits a modified power dissipation value which is less than an unmodified power dissipation value exhibited by said unmodified optical modulation system.

21. The modified optical modulation system of claim 20 wherein said modified driver impedance is selected within a driver impedance range from approximately 70 to 100 ohms.

22. The modified optical modulation system of claim 21 wherein said modified driver impedance is selected as approximately 85 ohms.

23. The modified optical modulation system of claim 20 wherein said modified modulator impedance and said modified driver impedance are selected to cooperatively produce an effective impedance of approximately 25 ohms for said modified optical modulation system.

24. The modified optical modulation system of claim 20 wherein said modified modulator impedance is different than said modified driver impedance.

25. The modified optical modulation system of claim 24 wherein said modified modulator impedance is selected within a modulator impedance range from approximately 25 to 40 ohms.

26. The modified optical modulation system of claim 25 wherein said modified modulator impedance is selected as approximately 35 ohms.

27. The modified optical modulation system of claim 20 wherein said modified power dissipation value is approximately 0.175 watts while said unmodified power dissipation value is approximately 0.3 watts.

28. The modified optical modulation system of claim 1 wherein said modified drive signal includes first and second data signals, said first and second data signals both containing signal information with said second data signal being 180-degrees out of phase with respect to said first data signal, and wherein said modified traveling-wave modulator includes first and second input ports for receiving said first and second data signals, respectively.

29. The modified optical modulation system of claim 28 wherein said first and second input ports are positionally arranged side by side on said modified traveling-wave optical modulator.

30. A modified optical modulation system, said modified optical modulation system being configured to replace an unmodified optical modulation system including an unmodified electrical amplifying arrangement and an unmodified optical modulating arrangement using a standard interface impedance therebetween, each of which systems is configured for modulating an input optical signal in response to at least one input electrical signal to produce a modulated optical signal, said modified optical modulation system comprising:

a modified electrical amplifying arrangement for amplifying the input electrical signal to produce a modified drive signal;

a modified optical modulating arrangement for receiving said modified drive signal and said input optical signal for use in modulating said input optical signal, said modified optical modulating arrangement including a modified modulator impedance which is selected irrespective of said standard interface impedance to velocity match, at least to an approximation, an electrical signal velocity of the modified drive signal in the modified optical modulating arrangement to an optical mode velocity at which the input optical signal travels during modulation in the modified optical modulating arrangement such that the modified drive signal is less than an unmodified drive signal which is produced by the unmodified electrical amplifying arrangement for use by the unmodified optical modulating arrangement; and a support arrangement defining an enclosed package, said support arrangement being configured for supporting the modified electrical amplifying arrangement and the modified optical modulating arrangement within said enclosed package.

31. The modified optical modulation system of claim 30 wherein said modified modulator impedance is selected to be different than said standard interface impedance, which standard interface impedance is 50 ohms.

32. The modified optical modulation system of claim 30 wherein said modified electrical amplifying arrangement includes a modified driver impedance, which modified driver impedance is selected irrespective of said standard interface impedance such that said modified optical modulation system exhibits a modified power dissipation value which is less than an unmodified power dissipation value exhibited by said unmodified optical modulation system.

33. The modified optical modulation system of claim 32 wherein said modified power dissipation value is approximately 0.175 watts while said unmodified power dissipation value is approximately 0.3 watts.

34. The modified optical modulation system of claim 32 wherein said modified driver impedance is selected within a driver impedance range from approximately 70 to 100 ohms.

35. The modified optical modulation system of claim 34 wherein said modified driver impedance is selected as approximately 85 ohms.

36. The modified optical modulation system of claim 32 wherein said modified modulator impedance is different than said modified driver impedance.

37. The modified optical modulation system of claim 36 wherein said modified modulator impedance is selected within a modulator impedance range from approximately 25 to 40 ohms.

38. The modified optical modulation system of claim 37 wherein said modified modulator impedance is selected as approximately 35 ohms.

39. A modified optical modulation system, said modified optical modulation system being configured to replace an unmodified optical modulation system including unmodified driver means and unmodified modulator means using a standard interface impedance therebetween, each of which systems is configured for modulating an input optical signal in response to at least one input electrical signal to produce a modulated optical signal, said modified optical modulation system comprising:

modified driver means for amplifying the input electrical signal to produce a modified drive signal;

modified modulator means for receiving said modified drive signal and said input optical signal for use in modulating the input optical signal, said modified modulator means including a modified modulator impedance which is selected irrespective of said standard interface impedance to velocity match, at least to an approximation, an electrical signal velocity of the modified drive signal in said modified modulator means to an optical mode velocity at which the input optical signal travels during modulation in said modified modulator means; and means for electrically connecting said modified amplifying means with said modified modulator means, said electrically connecting means cooperating with said modified driver means and said modified modulator means such that the modified drive signal is less than an unmodified drive signal which is produced by said unmodified driver means for use by said unmodified modulator means.

40. The modified optical modulation system of claim 39, further comprising means for supporting said modified driver means and said modified modulator means within a single package.

41. The modified optical modulation system of claim 39 wherein said modified modulator impedance is selected to be different than said standard interface impedance, which standard interface impedance is 50 ohms.

42. The modified optical modulation system of claim 39 wherein said modified driver means includes a modified driver impedance, which modified driver impedance is selected irrespective of said standard interface impedance such that said modified optical modulation system exhibits a modified power dissipation value which is less than an unmodified power dissipation value exhibited by said unmodified optical modulation system.

43. The modified optical modulation system of claim 42 herein said modified modulator impedance is different than said modified driver impedance.

44. A method for use in a modified optical modulation system, said modified optical modulation system being configured to replace an unmodified optical modulation system including an unmodified electrical driver and an unmodified traveling-wave modulator using a standard interface impedance therebetween, each of which systems is configured for modulating an input optical signal in response to at least one input electrical signal to produce a modulated optical signal, said method comprising the steps of:

providing a modified electrical driver for amplifying the input electrical signal to produce a modified drive signal;

arranging a modified traveling-wave modulator for receiving said modified drive signal and said input optical signal for use in modulating said input optical signal and configuring said modified traveling-wave modulator to include a modified modulator impedance which is selected irrespective of said standard interface impedance to velocity match, at least to an approximation, an electrical signal velocity of the modified drive signal in the modified traveling-wave modulator to an optical mode velocity at which the input optical signal travels during modulation in the modified traveling-wave modulator; and electrically connecting the modified traveling-wave modulator with said modified electrical driver such that the modified drive signal is less than an unmodified drive signal, which unmodified drive signal is produced by the unmodified electrical driver for use by the unmodified traveling-wave modulator.

45. The method of claim 44, wherein the electrically connecting step includes the step of wire bonding said modified traveling-wave optical modulator with said modified electrical driver.

46. The method of claim 44, further comprising the step of providing a support assembly for supporting the modified electrical driver and the modified traveling-wave optical modulator within a single package.

47. The method of claim 44 wherein step of arranging and configuring said modified traveling-wave modulator includes the step of setting said modified modulator impedance to be different than said standard interface impedance, which standard interface impedance is 50 ohms.

48. The method of claim 44, wherein the electrically connecting step includes the step of flip-chip bonding said modified traveling-wave modulator with the modified electrical driver.

49. The method of claim 44 wherein said modified electrical driver includes a modified driver impedance, and wherein said step of providing said modified electrical driver includes the step of selecting said modified driver impedance irrespective of said standard interface impedance such that said modified optical modulation system exhibits a modified power dissipation value which is less than an unmodified power dissipation value exhibited by said unmodified optical modulation system.

50. The method of claim 49 wherein said step of selecting said modified driver impedance includes the step of choosing said modified driver impedance within a driver impedance range from approximately 70 to 100 ohms.

51. The method of claim 50 wherein said step of choosing said modified driver impedance from said driver impedance range includes the step of setting said modified driver impedance as approximately 85 ohms.

52. The method of claim 49 wherein said step of arranging said modified traveling-wave optical modulator includes the step of selecting said modified modulator impedance irrespective of said standard interface impedance to be different than said modified driver impedance.

53. The method of claim 52 wherein said step of selecting said modified modulator impedance includes the step of choosing said modified modulator impedance within a modulator impedance range from approximately 25 to 40 ohms.

54. The method of claim 53 wherein said step of choosing said modified modulator impedance from said modulator impedance range includes the step of setting said modified modulator impedance as approximately 35 ohms.

55. A modified traveling-wave modulator for use in an optical modulation system for receiving an input optical signal and at least one input electrical signal to produce a modulated optical signal at an output, which modified traveling-wave modulator is configured to replace an unmodified traveling-wave modulator having a standard interface impedance and is fabricated on a z-cut lithium niobate substrate, said modified traveling-wave modulator comprising:

an electrode for guiding said input electrical signal along a particular path:

an optical waveguide for guiding said input optical signal therethrough; and a modified buffer layer disposed between the electrode and the optical waveguide, said buffer layer having a modified thickness value which is less than an unmodified buffer layer thickness that is used in said unmodified traveling-wave modulator such that said modified traveling-wave modulator exhibits a modified modulator impedance which is selected irrespective of said standard interface impedance, wherein said modified thickness value is chosen to velocity match, at least to an approximation, an electrical signal velocity of the input electrical signal in the modified traveling-wave modulator to an optical mode velocity, at which optical mode velocity the input optical signal travels during modulation in the modified traveling-wave modulator.

56. The modified traveling-wave modulator of claim 55 wherein said input electrical signal is characterized by a first electric field and said input optical signal is characterized by a second electric field, and wherein said modified thickness value of said modified buffer layer is configured such that a modified field overlap between said first and second electric fields within said modified traveling-wave modulator is greater than an unmodified field overlap between said first and second electric fields within said unmodified traveling-wave modulator.

57. The modified traveling-wave modulator of claim 55 wherein said modified modulator impedance is selected to be different than said standard interface impedance, which standard interface impedance is 50 ohms.

58. A modified traveling-wave modulator for use in an optical modulation system for receiving an input optical signal and at least one input electrical signal to produce a modulated optical signal at an output, which modified traveling-wave modulator is configured to replace an unmodified traveling-wave modulator having a standard interface impedance and is fabricated on an x-cut lithium niobate substrate, said modified traveling-wave modulator comprising:

a modified optical waveguide for guiding said input optical signal therethrough, said modified optical waveguide being configured in a particular way; and at least two electrodes for guiding said input electrical signal along a particular path, said electrodes defining at least one electrode gap therebetween, said electrode gap having a modified gap width which is less than an unmodified gap width that is used in said unmodified traveling-wave modulator, wherein said modified gap width cooperates with said modified optical waveguide configured in said particular way such that said modified traveling-wave modulator exhibits a modified modulator impedance which is selected irrespective of said standard interface impedance, said modified gap width being chosen to velocity match, at least to an approximation, an electrical signal velocity of the input electrical signal in the modified traveling-wave modulator to an optical mode velocity at which the input optical signal travels during modulation in the modified traveling-wave modulator.

59. The modified traveling-wave modulator of claim 55 wherein said modified optical waveguide is positionally arranged directly beneath said electrode gap.

60. The modified traveling-wave modulator of claim 58 wherein said input electrical signal is characterized by a first electric field and said input optical signal is characterized by a second electric field, and wherein said modified optical waveguide is positioned with respect to said electrodes in such a way that a modified field overlap between said first and second electric fields within said modified traveling-wave modulator is greater than an unmodified field overlap between said first and second electric fields within said unmodified traveling-wave modulator.

61. The modified traveling-wave modulator of claim 58 wherein said modified modulator impedance is selected to be different than said standard interface impedance, which standard interface impedance is 50 ohms.

62. A modified optical modulation system, said modified optical modulation system being configured to replace an unmodified optical modulation system including an unmodified electrical driver and an unmodified traveling-wave modulator using a standard interface impedance therebetween, each of which systems is configured for modulating an input optical signal in response to at least one input electrical signal to produce a modulated optical signal, said modified optical modulation system comprising:

a modified electrical driver for amplifying the input electrical signal to produce a modified drive signal; and a modified traveling-wave modulator for receiving said modified drive signal and said input optical signal for use in modulating said input optical signal, said modified traveling-wave modulator including a modified modulator impedance which is selected irrespective of said standard interface impedance such that the modified drive signal is less than an unmodified drive signal which is produced by the unmodified electrical driver for use by the unmodified traveling-wave modulator.

63. The modified optical modulation system of claim 62 further comprising a support assembly for supporting the modified electrical driver and the modified traveling-wave modulator within a single package.

64. The modified optical modulation system of claim 62, wherein the modified electrical driver and the modified traveling-wave modulator are electrically connected by a plurality of bonding wires.

65. The modified optical modulation system of claim 64 wherein the modified electrical driver and the modified traveling-wave modulator are electrically connected by said plurality of bonding wires such that a first end of each bonding wire is wire bonded to the modified electrical driver and a second end of each bonding wire is wire bonded to the modified traveling-wave modulator.

66. The modified optical modulation system of claim 62 wherein said modified electrical driver includes a modified driver impedance, which modified driver impedance is selected irrespective of said standard interface impedance such that said modified optical modulation system exhibits a modified power dissipation value which is less than an unmodified power dissipation value exhibited by said unmodified optical modulation system.

67. The modified optical modulation system of claim 66 wherein said modified modulator impedance is different than said modified driver impedance.

68. The modified traveling-wave modulator of claim 62 wherein said modified modulator impedance is selected to be different than said standard interface impedance, which standard interface impedance is 50 ohms.

69. The modified optical modulation system of claim 62 wherein said modified drive signal includes first and second data signals, said first and second data signals both containing signal information with said second data signal being 180-degrees out of phase with respect to said first data signal, and wherein said modified traveling-wave modulator includes first and second input ports for receiving said first and second data signals, respectively.

70. A modified optical modulation system, said modified optical modulation system being configured to replace an unmodified optical modulation system including an unmodified electrical driver and an unmodified traveling-wave modulator using a standard interface impedance therebetween, each of which systems is configured for modulating an input optical signal in response to at least one input electrical signal to produce a modulated optical signal, said unmodified electrical driver being configured for amplifying the input electrical signal to produce a drive signal, said modified optical modulation system including said unmodified electrical driver and also comprising:

a modified traveling-wave modulator for receiving said drive signal and said input optical signal for use in modulating said input optical signal, said modified traveling-wave modulator including a modified modulator impedance which is selected irrespective of said standard interface impedance to velocity match, at least to an approximation, an electrical signal velocity of the modified drive signal in the modified traveling-wave modulator to an optical mode velocity, at which the input optical signal travels during modulation in the modified traveling-wave modulator, wherein said modified traveling-wave modulator is terminated by a terminating impedance, which terminating impedance matches, at least to an approximation, said modified modulator impedance.

71. A modified optical modulation system, said modified optical modulation system being configured to replace an unmodified optical modulation system including an unmodified electrical driver and an unmodified traveling-wave modulator using a standard interface impedance therebetween, each of which systems is configured for modulating an input optical signal in response to at least one input electrical signal to produce a modulated optical signal, said unmodified electrical driver being configured for amplifying the input electrical signal to produce a drive signal, said modified optical modulation system including said unmodified electrical driver and also comprising:

a modified traveling-wave modulator for receiving said drive signal and said input optical signal for use in modulating said input optical signal, said modified traveling-wave modulator including a modified modulator impedance which is selected irrespective of said standard interface impedance such that the modified drive signal is less than an unmodified drive signal which is produced by the unmodified electrical driver for use by the unmodified traveling-wave modulator.

72. A modified traveling-wave modulator for use in an optical modulation system for receiving an input optical signal and a drive signal to produce a modulated optical signal at an output, which modified traveling-wave modulator is configured to replace an unmodified traveling-wave modulator having a standard interface impedance, said modified traveling-wave modulator comprising:

an electrode arrangement for guiding said input electrical signal along a particular path and characterized by a first electric field;

an optical waveguide for guiding said input optical signal therethrough so that the input optical signal is characterized by a second electric field; and a configuration for producing a modified field overlap between said first and second electric fields within said modified traveling-wave modulator that is greater than an unmodified field overlap between said first and second electric fields within said unmodified traveling-wave modulator such that a modified drive voltage required by the modified modulator to produce maximum extinction of the modulated optical signal is less than a given voltage required by the unmodified modulator to produce maximum extinction of the modulated optical signal.

73. The modified modulator of claim 72 wherein said unmodified modulator includes a standard interface impedance and wherein said modified traveling-wave modulator includes a modified modulator impedance, as part of said configuration, which is selected irrespective of said standard interface impedance.

74. The modified modulator of claim 73 wherein said substrate is formed from z-cut lithium niobate and wherein said configuration includes a modified buffer layer disposed between the electrode and the optical waveguide, said modified buffer layer having a modified thickness value which is less than an unmodified buffer layer thickness that is used in said unmodified traveling-wave modulator such that said modified traveling-wave modulator exhibits said modified modulator impedance which is selected irrespective of said standard interface impedance.

75. The modified modulator of claim 73 wherein said substrate is formed from x-cut lithium niobate and wherein said electrode arrangement includes at least two electrodes for guiding said modified drive signal along the particular path and said configuration includes a modified electrode gap having a modified gap width between the electrodes which is less than an unmodified gap width that is used in the unmodified traveling-wave modulator of said unmodified optical modulation system.

76. In producing a modified traveling-wave modulator for use in an optical modulation system for receiving an input optical signal and a drive signal to produce a modulated optical signal at an output, which modified traveling-wave modulator is configured to replace an unmodified traveling-wave modulator having a standard interface impedance, a method comprising the steps of:

forming an electrode arrangement for guiding said input electrical signal along a particular path and characterized by a first electric field;

arranging an optical waveguide for guiding said input optical signal therethrough so that the input optical signal is characterized by a second electric field; and producing a modified field overlap between said first and second electric fields within said modified traveling-wave modulator that is greater than an unmodified field overlap between said first and second electric fields within said unmodified traveling-wave modulator such that a modified drive voltage, required by the modified modulator to produce maximum extinction of the modulated optical signal is less than a given voltage required by the unmodified modulator to produce maximum extinction of the modulated optical signal.

77. The method of claim 76 wherein said unmodified modulator includes a standard interface impedance and wherein the step for producing the modified field overlap causes said modified traveling-wave modulator to include a modified modulator impedance, which is selected irrespective of said standard interface impedance.

78. The method of claim 77 wherein said substrate is formed from z-cut lithium niobate and wherein the step for producing the modified field overlap further includes the step of forming a modified buffer layer disposed between the electrode and the optical waveguide, said modified buffer layer having a modified thickness value which is less than an unmodified buffer layer thickness that is used in said unmodified traveling-wave modulator such that said modified traveling-wave modulator exhibits said modified modulator impedance which is selected irrespective of said standard interface impedance.

79. The method of claim 77 wherein said substrate is formed from x-cut lithium niobate and wherein the step for forming said electrode arrangement forms at least two electrodes for guiding said modified drive signal along the particular path and the step for producing the modified field overlap includes the step of providing a modified electrode gap having a modified gap width between the electrodes which is less than an unmodified gap width that is used in the unmodified traveling-wave modulator of said unmodified optical modulation system.

80. A modified traveling-wave modulator for use in an optical modulation system for receiving an input optical signal and a drive signal to produce a modulated optical signal at an output, which modified traveling-wave modulator is configured to replace an unmodified traveling-wave modulator having a standard interface impedance, said modified traveling-wave modulator comprising:

electrode means for guiding said input electrical signal along a particular path, as characterized by a first electric field;

optical waveguide means for guiding said input optical signal therethrough so that the input optical signal is characterized by a second electric field; and means for producing a modified field overlap between said first and second electric fields within said modified traveling-wave modulator that is greater than an unmodified field overlap between said first and second electric fields within said unmodified traveling-wave modulator such that a modified drive voltage required by the modified modulator to produce maximum extinction of the modulated optical signal is less than a given voltage required by the unmodified modulator to produce maximum extinction of the modulated optical signal.

\* \* \* \* \*